United States Patent
Huang et al.

(10) Patent No.: US 9,017,060 B2
(45) Date of Patent: Apr. 28, 2015

(54) ARC BLADE-SHAPED PROCESSING SURFACE STRUCTURE OF PAD CONDITIONER AND MANUFACTURING MOLD STRUCTURE THEREOF

(76) Inventors: Huang-Nan Huang, Taoyuan County (TW); Cheng-Fang Lee, Taoyuan County (TW)

( * ) Notice: Subject to any disclaimer, the term of this patent is extended or adjusted under 35 U.S.C. 154(b) by 703 days.

(21) Appl. No.: 13/338,455

(22) Filed: Dec. 28, 2011

(65) Prior Publication Data

US 2013/0171917 A1    Jul. 4, 2013

(51) Int. Cl.
| | | |
|---|---|---|
| *B29C 33/42* | (2006.01) | |
| *B29C 39/10* | (2006.01) | |
| *B24B 53/017* | (2012.01) | |
| *B24D 18/00* | (2006.01) | |
| *B29C 33/12* | (2006.01) | |

(52) U.S. Cl.
CPC ............... *B29C 39/10* (2013.01); *B24B 53/017* (2013.01); *B24D 18/0009* (2013.01); *B29C 33/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,648,733 | B2 * | 11/2003 | Roberts et al. | 451/41 |
| 7,329,174 | B2 * | 2/2008 | Hosaka et al. | 451/527 |
| 2004/0166790 | A1 * | 8/2004 | Balijepalli et al. | 451/526 |
| 2006/0019587 | A1 * | 1/2006 | Deopura et al. | 451/526 |
| 2006/0189269 | A1 * | 8/2006 | Roy et al. | 451/526 |
| 2011/0241258 | A1 * | 10/2011 | Chang et al. | 264/400 |

* cited by examiner

*Primary Examiner* — James Sanders
(74) *Attorney, Agent, or Firm* — Leong C. Lei

(57) ABSTRACT

An arc blade-shaped processing surface structure of a pad conditioner includes an outer frame, a combining layer and a plurality of polishing particles. The polishing particles are disposed on a surface of the combining layer, and the combining layer has a first region and a second region sequentially arrange from the center to the outside of the combining layer, and the second region has a plurality of arc-shaped protrusions arranged separately from one another and disposed around the external periphery of the first region, and the protrusions arranged in order and separated with an interval apart from each other can be used to provide an appropriate space for extension and rebound for a polished surface material to obtain a definite and uniform polishing effect.

2 Claims, 6 Drawing Sheets

ARC BLADE-SHAPED PROCESSING SURFACE STRUCTURE OF PAD CONDITIONER AND MANUFACTURING MOLD STRUCTURE THEREOF

BACKGROUND OF THE INVENTION

1. Field of the Invention

The present invention relates to the field of chemical mechanical polishing (CMP), in particular to an arc blade-shaped processing surface structure of a pad conditioner and a manufacturing mold structure thereof.

2. Description of the Related Art

As science and technology advance, and the market competition of high-tech electronic consumer products becomes severe, all wafer fabrication processes and designs tend to be high-density processing, and all wafer fabrication processes encounter high challenges.

Since integrated circuits of a chip are developed with an increasingly smaller wire width and a higher requirement on the planarization of a surface of the chip to overcome the difficulty of focusing in a lithographic process due to the height difference, therefore a general chemical mechanical polishing (CMP) process is provided to achieve the effects and the materials consumed in the CMP process mainly include a polishing pad, a polishing slurry and a pad conditioner, wherein the interaction between the pad conditioner and the polishing pad is a major factor of the cost of the CMP process.

At present, most of the pad conditioners increase the density of the polishing particles to provide the desired planarization process and manufacture in order to achieve the expected precision. When the pad conditioner is in use, the polishing surface with a uniform coarseness is produced at a shallow layer of the surface of the polishing pad, such that when the polishing slurry is used for polishing work pieces, the powerful and uniform material can be used for removing other materials effectively. However, there are tens of thousands of polishing particles disposed in an anisotropic polyhedron, and it is difficult to assure the consistence of the direction of the sharp end of the polishing particles, and thus involving a number of variables. Therefore, the functions and applications of the finished goods of the pad conditioners are key factors of the quality and reliability of the polishing process by the polishing pad. Compared with the situation of having an unstable production quality and failing to assure the sieving quality, the stability quality of the production cannot be controlled effectively for the planarization of the wafer surface.

In view of the aforementioned problems, the inventor of the present invention provides an arc blade-shaped processing surface structure of a pad conditioner comprising a plurality of arc-shaped protrusions formed at an outer periphery of the arc blade-shaped processing surface structure, and the protrusions are separated with an interval apart from each other and around the external periphery of the pad conditioner to form an arc blade-shaped structure, and an sharp end of the polishing particles of the protrusions has a height difference smaller than 125 μm. During a polishing process, the protrusions with the orderly partitioned design allows the surface material of the polishing pad to be in contact with the protrusions for the polishing effect, and after the polishing process is finished, the space between the protrusions can be extended and rebounded, and this process is performed repeatedly to assure a uniform polishing effect.

SUMMARY OF THE INVENTION

Therefore, it is a primary objective of the present invention to provide an arc blade-shaped processing surface structure of a pad conditioner, wherein a plurality of arc-shaped protrusions disposed at the external periphery of the pad conditioner forms a plurality of arc bladed shaped structures, such that during a polishing process, a same region is polished repeatedly by a multi-blade method to improve the efficiency of the polish significantly.

Another objective of the present invention is to provide an arc blade-shaped processing surface structure of a pad conditioner, wherein the shape of the protrusions and the separate protrusions are adopted to expand the space of rebound for the material on the surface of the polishing pad during a polishing process, so as to obtain a definite and uniform polishing effect.

To achieve the aforementioned objectives, the present invention provides an arc blade-shaped processing surface structure of a pad conditioner, comprising: an outer frame, which is a disc shaped structure, and includes a circular retaining wall formed at the periphery of the outer frame; a combining layer, filled inside the outer frame to form a disc shaped structure, and having a first region and a second region sequentially arranged from the center to the outside of the combining layer, and the second region has a plurality of arc-shaped protrusions, and the protrusions are arranged with an interval apart from each other and around the external periphery of the first region, and a plurality of polishing particles are disposed in the first region and the second region, and the polishing particles in the second region has a distribution density smaller than the distribution density of the polishing particles in the first region, and the sharp end of the polishing particles of the second region has a height difference smaller than 125 μm. Wherein, the outer frame is made of polyphenylene sulfide (PPS). Wherein, the polishing particle is made of one selected from the collection of natural diamond, artificial diamond, boron nitride, and silicon carbide. The polishing particles are formed on the combining layer by a method selected from the collection of resin adhesion, brazing consolidation, high-temperature sintering, electroplating, and ceramic consolidation.

In a preferred embodiment, each of the protrusions is substantially a hemispherical structure. During the polishing process, only the top of the protrusions is in a linear contact with the polishing pad, and an appropriate gap is formed between adjacent recessions, so that a surface material of the polishing pad can obtain the space for extension and rebound to achieve a better polishing effect.

Another objective of the present invention is to provide a manufacturing mold structure for an arc blade-shaped processing surface structure of a pad conditioner, and the manufacturing mold structure uses the design of a base mold having a plurality of arc grooves in areas of the external periphery of the base mold to combine a shaping plate and an air-pump device to manufacture the arc blade-shaped processing surface structure of the pad conditioner and achieve the effects of maintaining the manufacturing quality and improving the manufacturing efficiency.

To achieve the aforementioned objective, the present invention provides a manufacturing mold structure comprising: a base mold, being in a shape corresponding to the shape of the outer frame, and having a plurality of arc-shaped grooves corresponding to the second region, and each of the grooves having an interconnecting hole coupled to an air-pump device;

a shaping plate, installed on a side of the base mold, and having a plurality of blind holes for producing a vacuum suction to the grooves when the air-pump device is operated, and bending and deforming the shaping plate to be contained in the grooves;

an adhesive layer, formed on a side of the shaping plate, and disposed in the blind holes;

a non-sticky mesh plate, installed on a side of the shaping plate, and having a plurality of openings formed at positions corresponding to the openings respectively, and separately distributed on the polishing particles at the top of the non-sticky mesh plate; and an elastic press plate, installed on a side of the non-sticky mesh plate, for pressing and inserting a sharp end of the polishing particle inside the shaping plate, such that after the elastic press plate and the non-sticky mesh plate are removed, the outer frame is covered onto the base mold to form a containing space, and the combining layer being filled into the containing space, such that after the combining layer is condensed and shaped, a circular processing surface of the protrusions is formed and protruded from a surface of the second region.

Wherein, each of the blind holes is a cone-shaped hole or a pyramid-shaped hole with less than 90 degrees, and the blind holes are provided for containing the adhesive layer and the polishing particles, so that the polishing particles are erected after they are contained in the blind holes.

DETAILED DESCRIPTION OF THE PREFERRED EMBODIMENTS

The technical contents of the present invention will become apparent with the detailed description of a preferred embodiment and the illustration of related drawings as follows.

Figure 1:
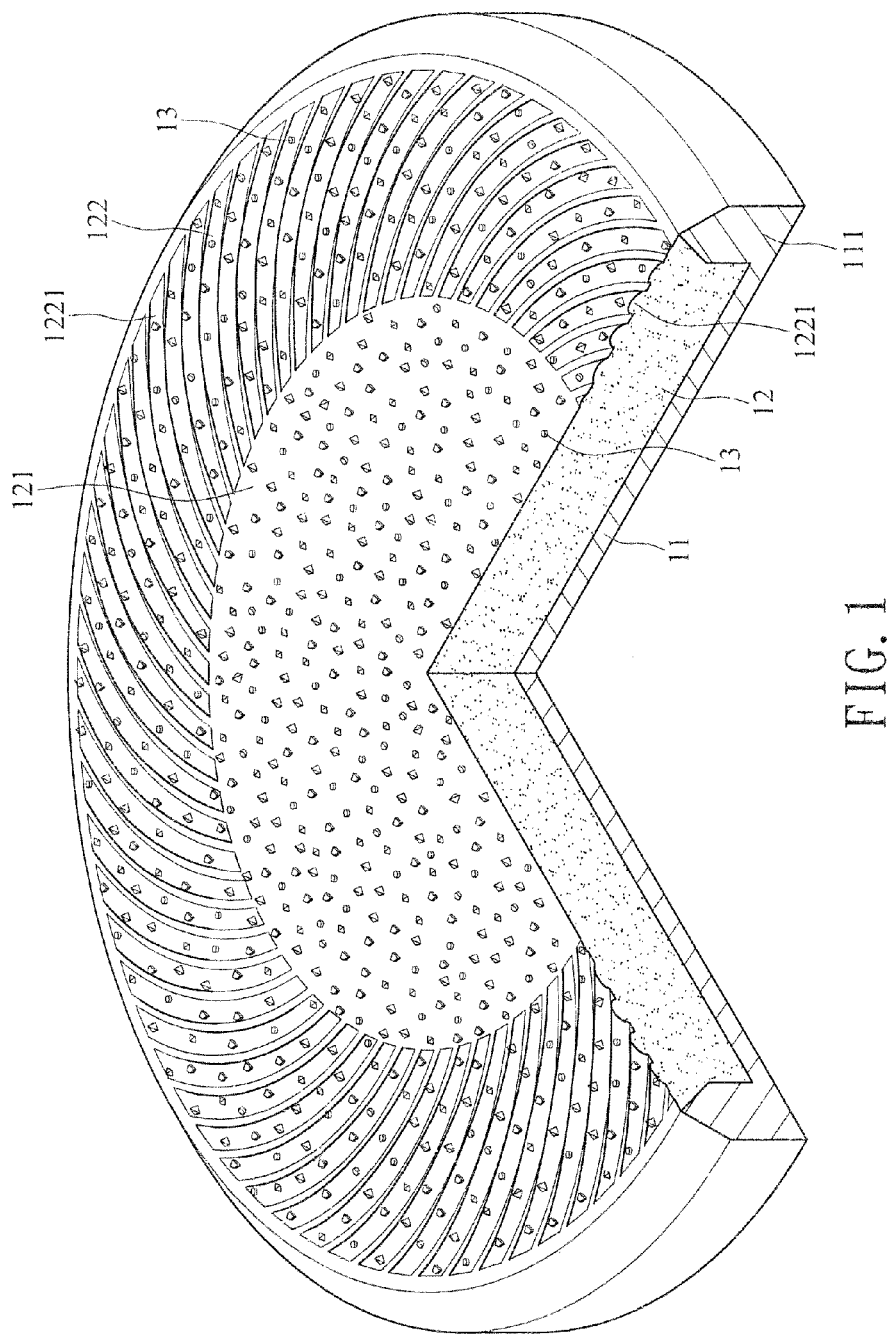
FIG. 1 is a schematic view of a preferred embodiment of the present invention.
Figure 2:
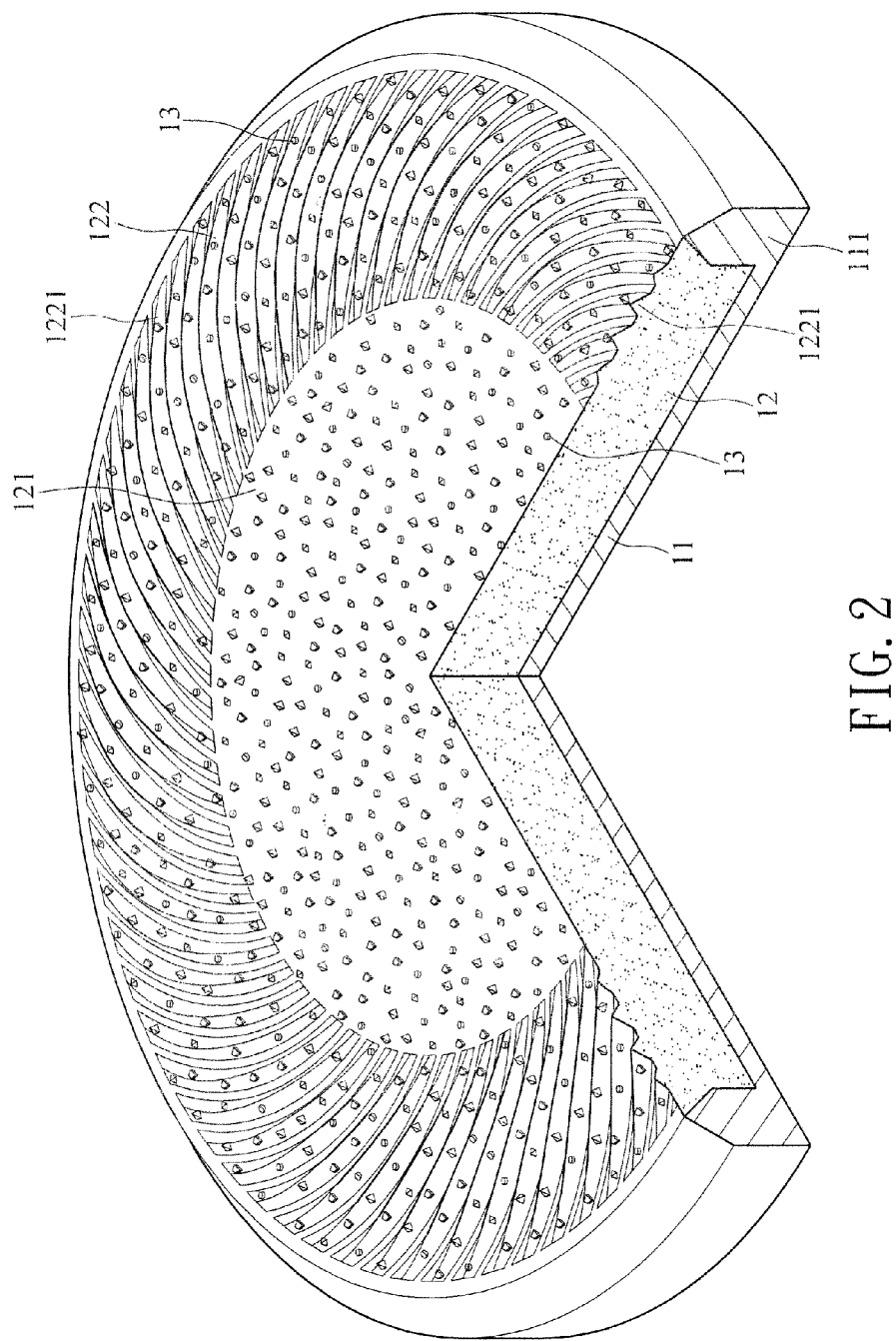
FIG. 2 is a schematic view of another preferred embodiment of the present invention.

With reference to FIGS. 1 and 2 for schematic views of preferred embodiments of the present invention respectively, an arc blade-shaped processing surface structure 1 of a pad conditioner in accordance with the present invention comprises an outer frame 11, a combining layer 12 and a plurality of polishing particles 13.

The outer frame 11 is a disc shaped structure made of polyphenylene sulfide (PPS) and a circular retaining wall 111 is formed at the periphery of the outer frame 11.

The combining layer 12 is filled into the outer frame 11 to form a disc shaped structure and has a first region 121 and a second region 122 sequentially arranged from the center to the outside of the combining layer 12, and the second region has a plurality of arc-shaped protrusions 1221, and each of the protrusions 1221 is a hemispherical structure viewing from a cross-sectional side, and the protrusions 1221 are disposed with an interval apart from one another and surround the external periphery of the first region 121 to form a plurality of arc blade-shaped protrusions at the periphery and protruded from the surface, and the processing surface structure has a flat surface at the center position. In FIG. 2, each of the protrusions 1221 can be a triangular structure. The polishing particles 13 is made of a material selected from the collection of natural diamond, artificial diamond, boron nitride, and silicon carbide, and have a hardness higher than that required for the purpose of polishing, and the polishing particles 13 are formed in the first region 121 and the second region 122 of the combining layer 12 by means of resin adhesion, brazing consolidation, high-temperature sintering, electroplating, and ceramic consolidation, and the polishing particles 13 in the second region 122 have a distribution density smaller than the distribution density of the polishing particles 13 in the first region 121, and a sharp end of the polishing particles 13 in the second region 122 has a height difference smaller than 125 µm.

During a polishing process, only the top of the protrusions 1221 is in a linear contact with a polishing pad (not shown in the figure). Since the protrusions 1221 are arranged orderly with specific width and length apart from one another to form a plurality of gap areas, therefore the a shallow-layer material at of the polishing pad is compressed and deformed by the protrusions 1221 during the polishing process, and the polishing particles 13 are provided for the polishing. When the shallow-layer material is no longer in contact with the protrusions 1221, the shallow-layer material with the design of having equidistant gaps forms a space for extension and rebound, so that the shallow-layer material can be used for the next polishing after the shallow-layer material restore its original form by its elasticity, and this process can be repeated to assure a definite and uniform polishing effect. Compared with the conventional planar processing surface having the problems that the uniformly pressed shallow-layer material used for the polishing may have the possibility of unable to restore its original form or having an uneven flat surface after resuming the elasticity, and thus failing and the definite and uniform polishing effect cannot be achieved, the present invention can improve the polishing effect effectively.

Figure 3:
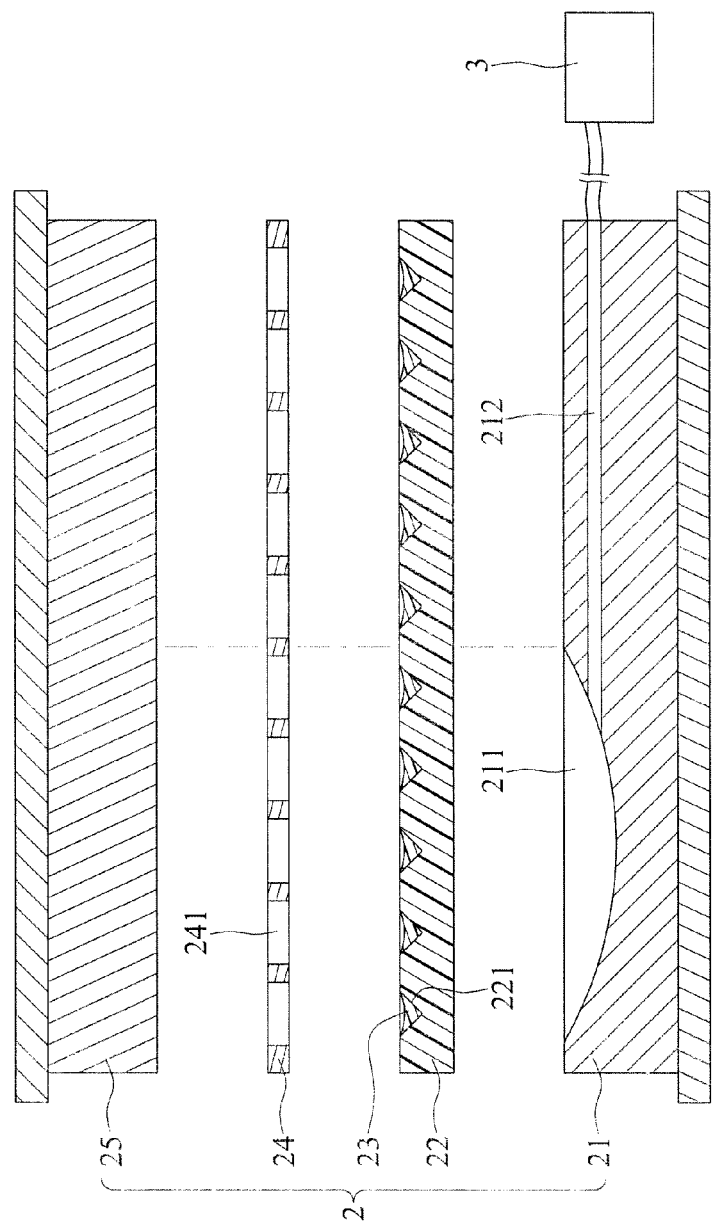
FIG. 3 is a schematic view of a manufacturing mold structure of another preferred embodiment of the present invention.

To manufacture the arc blade-shaped processing surface structure 1 of the pad conditioner, the inventor of the present invention further provides a manufacturing mold structure 2 exclusively used as a vacuum pressing device. With reference to FIG. 3 for a schematic view of a manufacturing mold structure of a preferred embodiment of the present invention, the manufacturing mold structure 2 comprises a base mold 21, a shaping plate 22, an adhesive layer 23, a non-sticky mesh plate 24 and an elastic press plate 25.

Wherein, the base mold 21 has a shape corresponding to the shape of the outer frame 11, and the base mold 21 has a plurality of arc-shaped grooves 211 corresponding to the second region 122, and each of the grooves 211 has an interconnecting hole 212 connected to an air-pump device 3. It is noteworthy to point out that the grooves 211 have a cross-sectional shape substantially in a rectangular or hemispherical form, and the grooves 211 are designed with a curve extending from the periphery to the center of the base mold 21 to form a plurality of arc-blade like structures.

The shaping plate 22 is covered on the top of the base mold 21, and the shaping plate 22 includes a plurality of blind holes 221, each of the blind holes 221 is a cone-shaped hole or a pyramid-shaped hole with an angle of smaller than 90 degrees for temporarily containing the polishing particles 13 and erecting the polishing particles 13. When the air-pump device 3 is operated, a vacuum suction of the grooves 211 is produced. Since the shaping plate 22 comes with a certain tenacity, the shaping plate 22 is bent and deformed by the vacuum suction and contained in the grooves 211. It is noteworthy to point out that the deformed shape is not limited to the concave arc shape, but it can be a concave triangular shape.

The adhesive layer 23 is disposed in the blind holes 221 of the shaping plate 22 for temporarily fixing the sharp end of the polishing particles 13.

The non-sticky mesh plate 24 is disposed at the top of the shaping plate 22, and the non-sticky mesh plate 24 has a plurality of openings 241 formed at positions corresponding to the blind holes 221 respectively.

The elastic press plate 25 is disposed at the top of the non-sticky mesh plate 24, so that when the polishing particles 13 are disposed at the top of the non-sticky mesh plate 24, the polishing particles 13 are disposed in the openings 241, and the sharp end of the polishing particles 13 is temporarily fixed onto the adhesive layer 23 of the blind holes 221.

Figure 4:
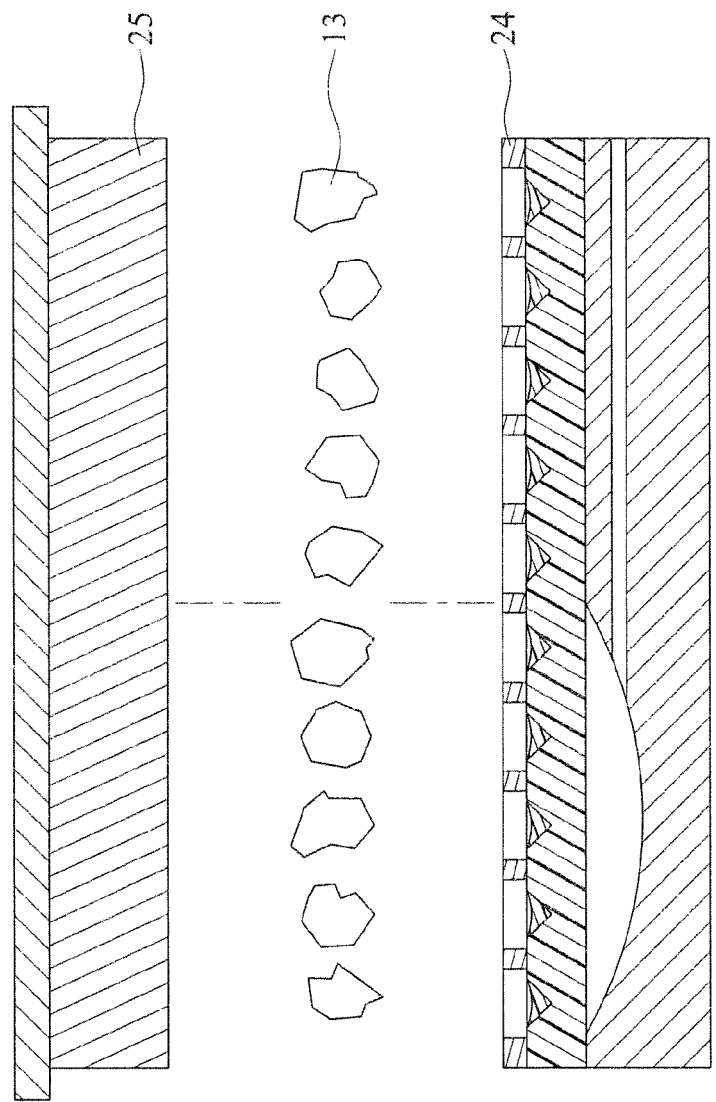
FIG. 4 is a first schematic view of a status when the present invention is manufactured.
Figure 5:
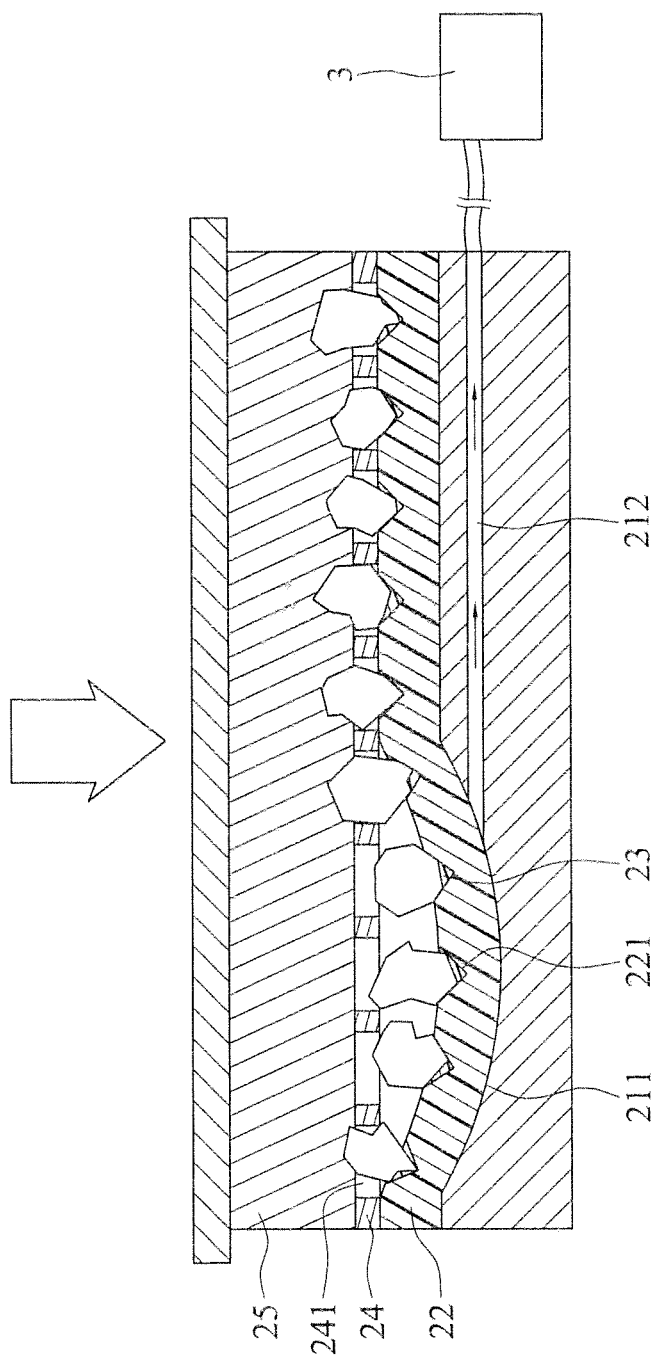
FIG. 5 is a second schematic view of a status when the present invention is manufactured.
Figure 6:
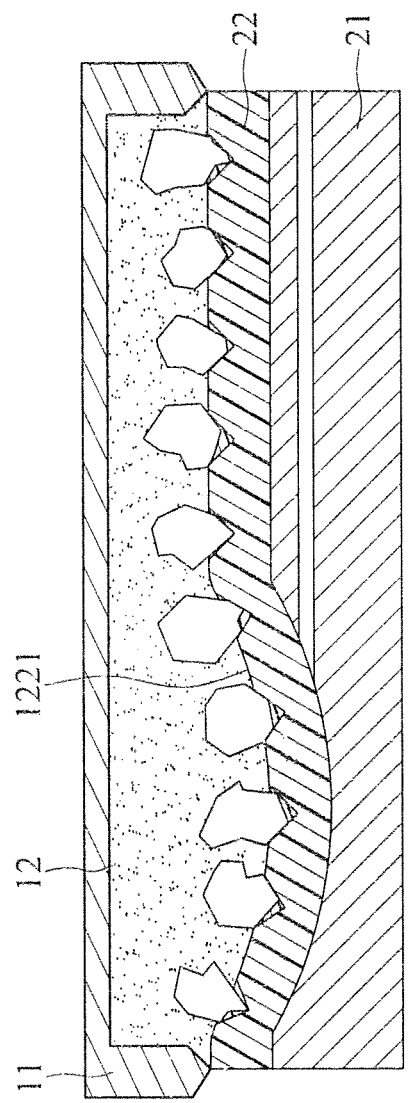
FIG. 6 is a third schematic view of a status when the present invention is manufactured.

With reference to FIGS. 4 to 6 for schematic views of a status when the present invention is manufactured respectively and also FIG. 3, the polishing particles 13 are disposed on the non-sticky mesh plate 24 as shown in FIG. 4, and the air-pump device 3 is provided for producing a vacuum suction of the grooves 211 through the interconnecting holes 212 as shown in FIG. 5, such that a portion of the shaping plate 22 corresponding to the position of the grooves 211 is sucked and contained in the grooves 211 and bent, and the top of the shaping plate 22 is corresponsive to the positions of the grooves 211 to form a plurality of arc-shaped recessions, and the polishing particles 13 are passed through the openings 241 and disposed in the blind holes 221, and then the elastic press plate 25 presses on the polishing particles 13, so that the sharp end of the polishing particles 13 is temporarily fixed into the adhesive layer 23. In FIG. 6, after the elastic press plate 25 and the non-sticky mesh plate 24 are removed, the outer frame 11 is covered onto the base mold 21 to form a containing space, and the combining layer 12 is filled into the containing space. After the combining layer 12 is condensed and formed, and the base mold 21, the shaping plate 22 and the adhesive layer 23 are removed, the protrusions 1221 are formed at the periphery of the combining layer 12 and protruded from the surface of the combining layer 12 to form a plurality of arc blade like processing surfaces.

In summation, the arc blade-shaped processing surface structure 1 of the pad conditioner of the present invention has a plurality of cone-shaped or pyramid-shaped blind holes 221 with an angle of 90 degrees formed at the periphery of the shaping plate 22 to combine the adhesive layer 23 and temporarily fix the polishing particles 13 of different polyhedrons, and the polishing particles are pressed by the elastic press plate 25 and positioned randomly to have different heights. After being fixed by the outer frame 11 and the combining layer 12, the required processing surface is formed. Since the base mold 21 has the arc-shaped grooves 211 and the arc blade-shaped processing surface structure 1 of the pad conditioner in the shape of a saw-tooth arc knife is manufactured to prevent a non-uniform processing caused by an uncertain blunt processing area of the polishing pad and to eliminate separations and faults. In addition, the processing depth can be controlled by adjusting the contact area to prevent the polishing pad from being consumed excessively or scratched, so as to provide a more definite and uniform process of the coarseness. Therefore a more stable, quicker and smoother operation of the high-end CMP process can be achieved. In addition, the arc blade-shaped processing surface structure 1 of the pad conditioner of the present invention can be manufactured by using a skillfully designed manufacturing mold structure 2, and the manufacturing quality can be maintained effectively, and the manufacturing efficiency can be improved.

What is claimed is:

1. A manufacturing mold structure for manufacturing an arc blade-shaped processing surface structure of a pad conditioner comprising an outer frame, being a disc shaped structure, and having a circular retaining wall formed at the periphery of the outer frame; a combining layer, filled inside the outer frame to form a disc shaped structure, and having a first region and a second region sequentially arranged from the center of the combining layer to the outside, and the second region having a plurality of arc-shaped protrusions, and the protrusions being disposed separately form one another and disposed around the external periphery of the first region; and a plurality of polishing particles, disposed in the first region and the second region, and the polishing particles in the second region having a distribution density less than the distribution density of the polishing particles of in the first region, and the sharp end of the polishing particles of the second region having a height difference less than 125 gm;

the mold structure comprising:

a base mold, being in a shape corresponding to the shape of the outer frame, and having a plurality of arc-shaped grooves corresponding to the second region, and each of the grooves having an interconnecting hole coupled to an air-pump device;

a shaping plate, installed on a side of the base mold, and having a plurality of blind holes for producing a vacuum suction to the grooves when the air-pump device is operated, and bending and deforming the shaping plate to be contained in the grooves;

an adhesive layer, formed on a side of the shaping plate, and disposed in the blind holes;

a non-sticky mesh plate, installed on a side of the shaping plate, and having a plurality of openings formed at positions corresponding to the openings respectively, and separately distributed on the polishing particles at the top of the non-sticky mesh plate; and an elastic press plate, installed on a side of the non-sticky mesh plate, for pressing and inserting a sharp end of the polishing particle inside the shaping plate, such that after the elastic press plate and the non-sticky mesh plate are removed, the outer frame is covered onto the base mold to form a containing space, and the combining layer being filled into the containing space, such that after the combining layer is condensed and shaped, a circular processing surface of the protrusions is formed and protruded from a surface of the second region.

2. The manufacturing mold structure of claim 1, wherein the blind hole is one selected from the collection of a cone-shaped hole and a pyramid-shaped hole with less than 90 degrees.

* * * * *